United States Patent [19]

Schilling

[11] Patent Number: 5,420,896
[45] Date of Patent: * May 30, 1995

[54] SYNCHRONOUS SPREAD-SPECTRUM COMMUNICATIONS SYSTEM AND METHOD

[75] Inventor: Donald L. Schilling, Sands Point, N.Y.

[73] Assignee: InterDigital Technology Corporation, Wilmington, Del.

[*] Notice: The portion of the term of this patent subsequent to Nov. 24, 2009 has been disclaimed.

[21] Appl. No.: 75,114

[22] Filed: Jun. 11, 1993

Related U.S. Application Data

[63] Continuation of Ser. No. 626,109, Dec. 14, 1990, Pat. No. 5,228,056.

[51] Int. Cl.⁶ .............................................. H04K 1/00
[52] U.S. Cl. .................................. 375/205; 375/200; 375/201; 380/34
[58] Field of Search ................ 375/1, 38, 48, 66, 89; 455/59, 103, 209, 216, 303; 380/34

[56] References Cited

U.S. PATENT DOCUMENTS

| | | | |
|---|---|---|---|
| 3,819,872 | 6/1974 | Hamrick | 179/41 |
| 4,193,031 | 3/1980 | Cooper | 455/38 |
| 4,392,220 | 7/1983 | Hirosaki et al. | 370/18 |
| 4,435,821 | 3/1984 | Ito et al. | 375/1 |
| 4,484,335 | 11/1984 | Mosley et al. | 375/1 |
| 4,599,490 | 7/1986 | Cornell et al. | 179/2 |
| 4,672,658 | 6/1987 | Kavenhrad et al. | 379/63 |
| 4,752,939 | 6/1988 | Amoroso et al. | 375/1 |
| 4,765,753 | 8/1988 | Schmidt | 379/60 |
| 4,837,823 | 6/1989 | Ham et al. | 380/34 |
| 4,843,612 | 6/1989 | Brusch et al. | 375/1 |
| 4,901,307 | 2/1990 | Gilhousen et al. | 370/18 |
| 4,962,507 | 10/1990 | Renshaw | 375/1 |
| 4,979,183 | 12/1990 | Cowart | 375/1 |
| 5,022,046 | 6/1991 | Morrow, Jr. | 375/1 |
| 5,036,330 | 7/1991 | Imae et al. | 342/357 |
| 5,056,109 | 10/1991 | Gilhousen et al. | 375/1 |
| 5,077,753 | 12/1991 | Gray, Jr. et al. | 375/1 |
| 5,077,754 | 12/1991 | Namioka | 375/1 |
| 5,101,501 | 3/1992 | Gilhousen et al. | 455/33 |

(List continued on next page.)

FOREIGN PATENT DOCUMENTS 0265178  4/1988  European Pat. Off. .

OTHER PUBLICATIONS

Nettleton, Raymond W., Spectral Efficiency in Cellular Land-Mobile Communications: A Spread-Spectrum Approach (1978) (unpublished Ph.D. dissertation, Purdue University).

(List continued on next page.)

Primary Examiner—Tod R. Swann
Attorney, Agent, or Firm—David Newman & Associates

[57] ABSTRACT

A spread spectrum communications system for use over a communications channel, including a transmitter-generic-chip-code generator, a transmitter-message-chip-code generator, an EXCLUSIVE-OR gate, a combiner, a transmitter, a receiver-generic-chip-code generator, a receiver-generic mixer, a generic-bandpass filter, a receiver-message-chip-code generator, a receiver-message mixer, a message-bandpass filter, and a synchronous detector. The transmitter-generic-chip-code generator generates a generic-chip-code signal and the transmitter-message-chip-code generator generates a message-chip-code signal. The EXCLUSIVE-OR gate spread-spectrum processes message data with the message-chip-code signal to generate a spread-spectrum signal. The combiner combines the generic-chip-code signal with the spread-spectrum signal. The transmitter transmits the combined generic-chip-code signal and spread-spectrum signal, on a carrier signal over the communications channel as a spread-spectrum-communications signal. The receiver-generic-chip-code generator generates a replica of the generic-chip-code signal. The generic mixer recovers the carrier signal from the spread-spectrum-communications signal. The receiver-message-chip-code generator generates a replica of the message-chip-code signal. The receiver-message mixer despreads the spread-spectrum-communications signal as a modulated-data signal. The tracking and acquisition circuit uses the recovered carrier signal for synchronizing the replicas of the generic-chip-code signal to the recovered carrier signal. The synchronous detector synchronously demodulates the modulated-data signal as received data.

4 Claims, 6 Drawing Sheets

U.S. PATENT DOCUMENTS

| | | | |
|---|---|---|---|
| 5,103,459 | 4/1992 | Gilhousen et al. | 375/1 |
| 5,109,390 | 4/1992 | Gilhousen et al. | 375/1 |
| 5,228,056 | 7/1993 | Schilling | 375/1 |
| 5,257,283 | 10/1993 | Gilhousen et al. | 375/1 |
| 5,260,967 | 11/1993 | Schilling | 375/1 |
| 5,263,045 | 11/1993 | Schilling | 375/1 |

OTHER PUBLICATIONS

Cooper, George R. and Nettleton, Ray, W., "Cellular Mobile Technology: The Great Multiplier," *IEEE Spetrum*, Jun. 1983, pp. 30-37.

Blasbalg, H, "A Comparison of Pseudo-Noise and Conventional Modulation For Multiple-Access Satellite Communications," *IBM Journal of Research and Development*, vol. 9, No. 4, Jul. 1965, pp. 241-255.

Dixon, Robert C., *Spread Spectrum Systems* (John Wiley & Sons, Inc.: New York, 3d. ed. 1984), pp. 412-413. *The International Dictionary of Physics and Electronics* (D. Van Nostrand Co.: Princeton, NJ, 2d. ed. 1961) pp. 612-952.

Robinson, Vester, *Solid-State Circuit Analysis*, (Reston Publishing Co.: Reston, VA, 1975), pp. 309-314.

Alavi, Hossein, Power Control and Interference Management in a Spread-Spectrum Cellular Mobile Radio System (1984) (unpublished Ph.D. dissertation, Michigan State University).

Scholtz, Robert A., "The Origins of Spread-Spectrum Communications," *IEEE Transactions on Communications* (May 1982), vol. Com 30, No. 5, pp. 822-855.

Fluhr, Z. C. and Porter, P. T., "Advanced Mobile Phone Service: Control Architecture," *The Bell System Technical Journal* (Jan. 1979), vol. 58, No. 1, pp. 43-69.

DeGaudenzi, R. and Viola, R., "A Novel Code Division Multiple Access System for High Capacity Mobile Communications Satellites," *ESA Journal* (1989), vol. 13, pp. 303-327.

Stiffler, J. J., *Theory of Synchronous Communications* (Prentice-Hall, Inc.: New Jersey), table of contents listing.

Pleading in suit between InterDigital Technology Corp and Oki America, Inc et al., Defendant Qualcomm Incorporated Supplemental Responses to Plaintiff's interrogatories 3, 5, 12, and 13; U.S. Dist. Ct for the Eastern Dist. of PA; Civil Case No 93-cv-2004 (Bartle, J.) pp. 5-6, 12-13.

SYNCHRONOUS SPREAD-SPECTRUM COMMUNICATIONS SYSTEM AND METHOD

RELATED PATENTS

This patent is a continuation of patent application entitled, SYNCHRONOUS SPREAD-SPECTRUM COMMUNICATIONS SYSTEM AND METHOD, having Ser. No. 07/626,109, filing date Dec. 14, 1990, and now issued as U.S. Pat. No. 5,228,056, with issue date of Jul. 13, 1993. The benefit of the earlier filing date of the parent patent application is claimed pursuant to 35 U.S.C. §120.

BACKGROUND OF THE INVENTION

This invention relates to spread-spectrum communications and more particularly to a system and method for synchronously demodulating a spread-spectrum-communications signal using a reference carrier signal supplied on a spread-spectrum channel by the transmitter.

DESCRIPTION OF THE PRIOR ART

Figure 1:
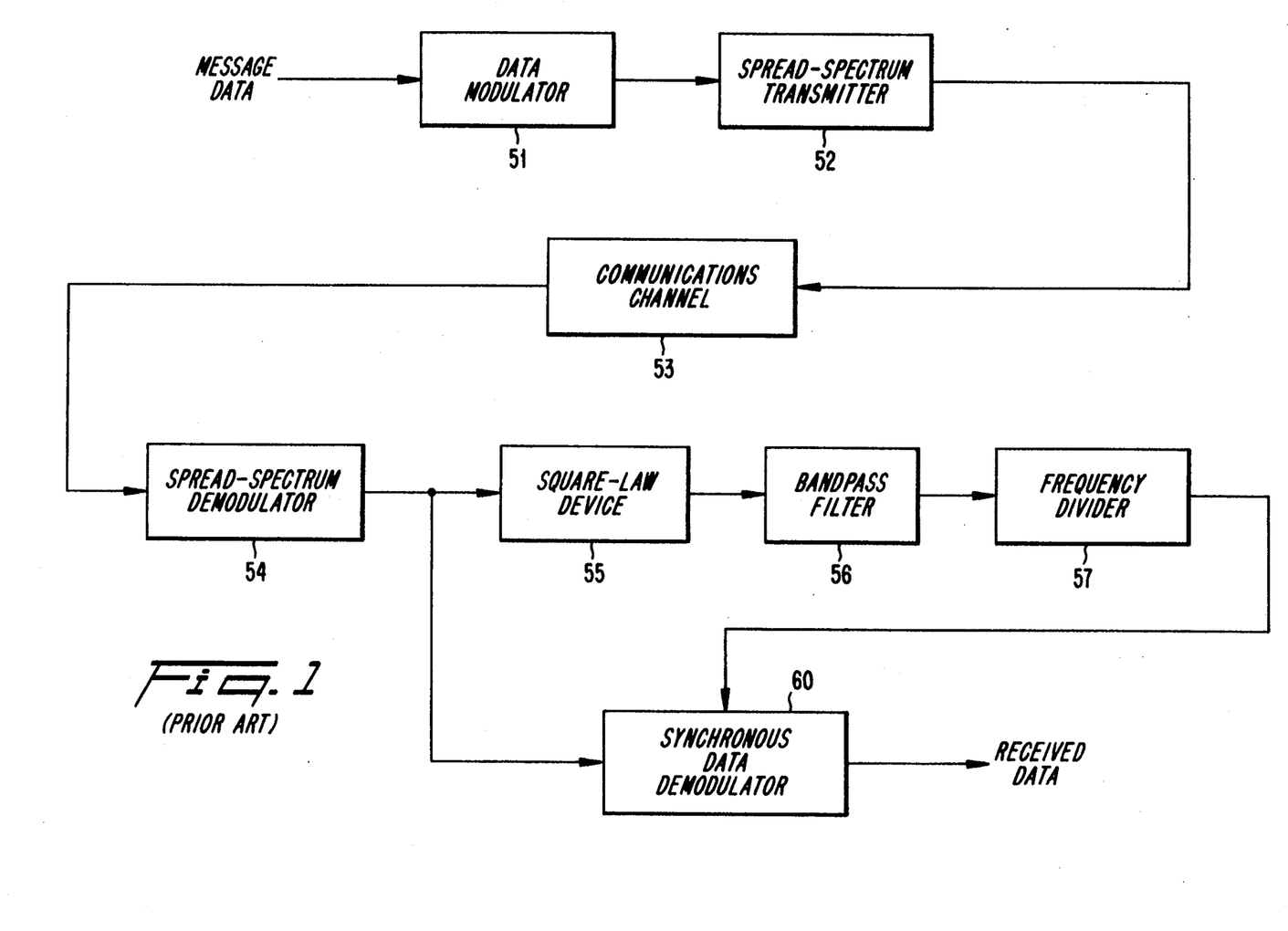
FIG. 1 is a prior art scheme for synchronously recovering message data.

Referring to FIG. 1 message data d(t), are processed by spread-spectrum modulator 51, using a message chip code signal, $g_1(t)$, to generate a spread-spectrum data signal. The spread-spectrum data signal is processed by transmitter 52 using a carrier signal at a carrier frequency $g_1(t)$, and transmitted over communications channel 53.

At a receiver, a spread-spectrum demodulator 54 despreads the received spread-spectrum signal, and the message data are recovered by synchronous data demodulator 60 as received data. The synchronous data demodulator 60 uses a reference signal for synchronously demodulating the despread spread-spectrum signal. The square-law device 55, bandpass filter 56 and frequency divider 57 are well known in the art for generating a reference signal from a received modulated data signal.

In a fading channel, such as the ionosphere or any channel containing multipath, or more generally, any channel in which the received signal's amplitude fluctuates with time, synchronous demodulation is not practical since the phase of the incoming signal typically is not the same as the phase of the reference. In such cases differential phase shift keying (DPSK) is employed. With DPSK the received signal is delayed by one symbol and multiplied by the undelayed signal. If the resulting phase is less than ±90° a 0-bit is declared, otherwise a 1-bit is declared. Such a system is complex and suffers degradation of about 6 dB at error rates of $10^{-2}$.

OBJECTS OF THE INVENTION

An object of the invention is a system and method for synchronously demodulating a modulated-data signal embedded in a spread-spectrum-communications signal, which performs well whether or not the signal is fading.

Another object of the invention is to send a carrier signal on a separate spread-spectrum channel for a data link for demodulating a modulated-data signal embedded in a spread-spectrum-communications signal for use in a fading channel.

An additional object of the invention is synchronous spread-spectrum-communications system.

SUMMARY OF THE INVENTION

According to the present invention, as embodied and broadly described herein, a spread spectrum communications system for use over a communications channel is provided comprising generic means, message means, spreading means, summer means, transmitting means, generic-spread-spectrum-processing means, message-spread-spectrum-processing means, acquisition and tracking means, detection means and synchronous means. The generic means generates a generic-chip-code signal and the message means generates a message-chip-code signal. The spreading means generates a spread-spectrum signal by spread-spectrum processing message data with the message-chip-code signal. The message data and the message-chip-code signal preferably have timing synchronized to the generic-chip-code signal. The summer means combines the generic-chip-code signal with the spread-spectrum-processed signal. The transmitting means transmits the combined generic-chip-code signal and spread-spectrum-processed signal, over the communications channel as a spread-spectrum-communications signal.

At a receiver, the generic-spread-spectrum-processing means recovers the carrier signal from the spread-spectrum-communications signal, and the message-spread-spectrum-processing means despreads the spread-spectrum-communications signal as a modulated-data signal. The acquisition and tracking means tracks the recovered-carrier signal for synchronizing the generic-spread-spectrum-processing means to the recovered-carrier signal. The message-spread-spectrum-processing means derives synchronization from a replica of the generic-chip-code signal provided by the generic-spread-spectrum-processing means. The detection means may be nonsynchronous or synchronous, for converting the modulated-data signal to a detected signal. The synchronous means uses the replica of the generic-chip-code signal produced by the generic-spread-spectrum-processing means for synchronizing the "integrating and dumping" of the detected signal to received data.

The present invention may be extended to handle a plurality of message data. Accordingly, the present invention further includes a plurality of message means and a plurality of spreading means. The plurality of message means generates a plurality of message chip-code signals. The plurality of message data and the plurality of message-chip-code signals all have synchronous timing derived from the generic-chip-code signal. The plurality of spreading means generates a plurality of spread-spectrum signals by spread-spectrum processing the plurality of message data with the plurality of message-chip-code signals, respectively.

The present invention also includes simultaneously receiving a spread-spectrum-communications signal having a plurality of spread-spectrum-processed signals. In this case, the receiver further includes a plurality of message-spread-spectrum-processing means, a plurality of detection means and a plurality of synchronous means. The acquisition and tracking means tracks the recovered-carrier signal for synchronizing the generic-spread-spectrum-processing means to the recovered-carrier signal. The plurality of message-spread-spectrum-processing means derive their synchronization from the replica of the generic-chip-code signal, from the generic-spread-spectrum-processing means. The plurality of message-spread-spectrum-processing means despreads the spread-spectrum-communications signal as a plurality of modulated-data signals, respectively. The plurality of detection means may be synchronous or nonsynchronous, for converting the plurality of modulated-data signals to a plurality of detected signals. The plurality of synchronous means uses the replica of the generic-chip-code signal produced by the generic-spread-spectrum-processing means for synchronizing the detection of the plurality of detected signals to a plurality of received data.

The present invention also includes a method for synchronously modulating and demodulating spread spectrum communications. The method comprises the steps of generating a generic-chip-code signal and a message-chip-code signal. The message data are modulo-2 added to the message-chip-code signal to generate a spread-spectrum-processed signal. The generic-chip-code signal and the spread-spectrum-processed signal are combined and transmitted on a carrier signal over the communications channel as a spread-spectrum-communications signal.

At the receiver, the steps include recovering the carrier signal from the spread-spectrum-communications signal and despreading the spread-spectrum-communications signal as a modulated-data signal. The recovered-carrier signal is used to synchronize the step of generating a replica of the generic-chip-code signal. More particularly, a replica of the generic-chip-code signal is correlated with the spread-spectrum-communications signal, which has a generic channel defined by the generic-chip-code signal at the transmitter. If the signal out of the generic-bandpass filter is small, then the acquisition and tracking circuit delays the phase of the generic-chip-code signal and the correlation process is repeated. If the phase of the replica of the generic-chip-code signal and the generic-chip-code signal in the spread-spectrum-communications signal are the same, then the output of the generic-bandpass filter will be at a high voltage level.

A replica of the message-chip-code signal is synchronized to the replica of the generic-chip-code signal for despreading the spread-spectrum-communications signal as a modulated-data signal. The modulated-data signal is detected as a detected signal. The recovered-carrier signal optionally may be used to synchronously demodulate the modulated-data signal as the detected signal. The detected signal is synchronously converted to received data, by using timing from the replica of the generic-chip-code signal to control "integrating and dumping" functions of a lowpass filter and electronic switch.

The present invention may include further the steps of generating a plurality of message-chip-code signals. A plurality of message data is modulo-2 added to the plurality of message-chip-code signals, to generate a plurality of spread-spectrum-processed signals, respectively. The generic-chip-code signal and the plurality of spread-spectrum-processed signals are combined and transmitted on a carrier signal over the communications channel as the spread-spectrum-communications signal. The plurality of message data and the plurality of message-chip-code signals preferably have synchronous timing to the generic-chip-code signal.

When the spread-spectrum-communications signal includes a plurality of spread-spectrum-processed signals, the present invention may include further the steps of despreading the spread-spectrum-communications signal as a plurality of modulated-data signals. The recovered-carrier signal is used to synchronize the step of generating a replica of the generic-chip-code signal. A replica of the plurality of message-chip-code signals is synchronized to the replica of the generic-chip-code signal, for despreading the spread-spectrum-communications signal as a plurality of modulated-data signals. The plurality of modulated-data signals is detected as a plurality of received signals, which is converted to a plurality of detected data.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings, wherein like reference numerals indicate like elements throughout the several views.

Figure 2:
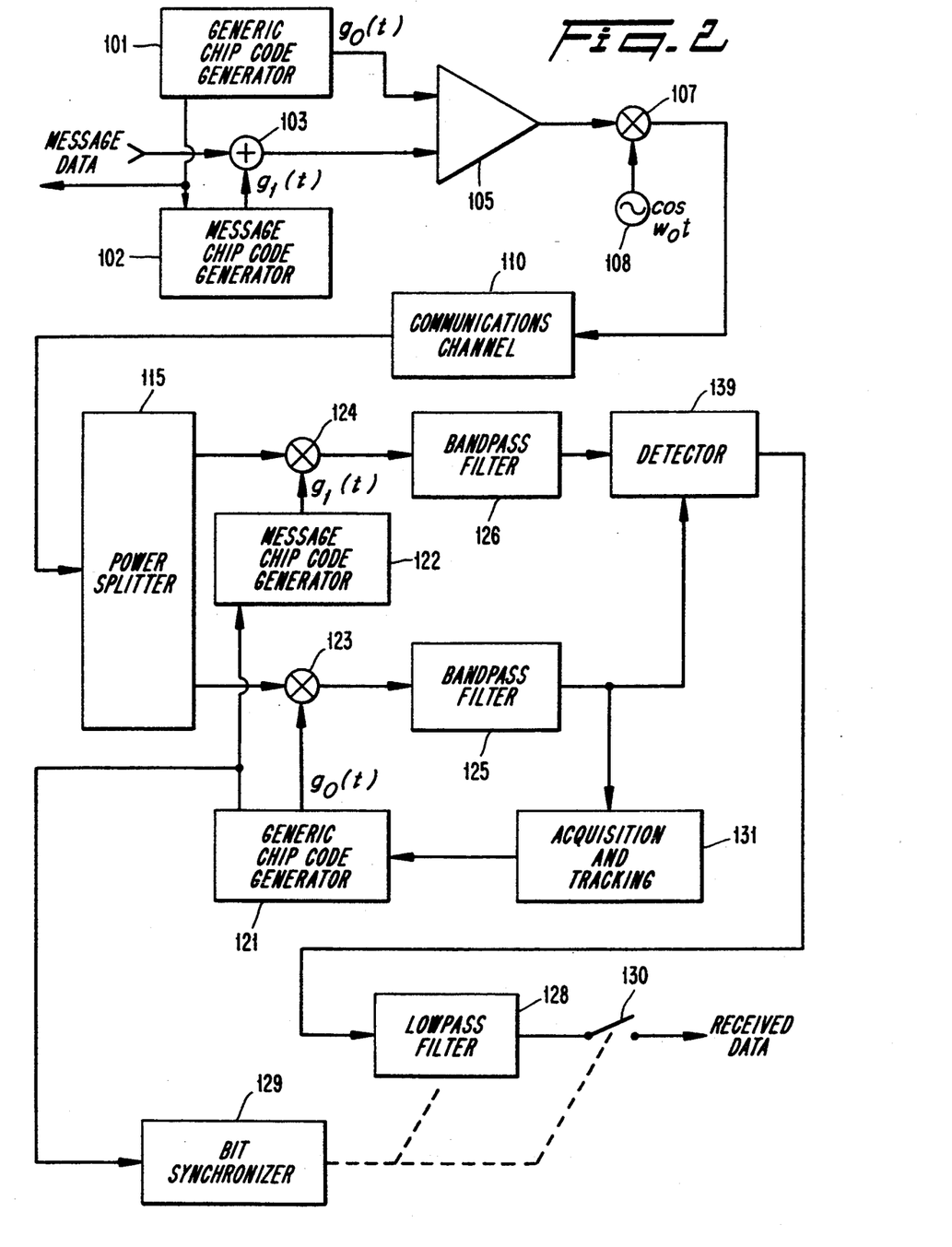
FIG. 2 shows a synchronous spread-spectrum system with a bit synchronizer, synchronized to a generic chip code generator according to the present invention.

As illustratively shown in FIG. 2, a spread spectrum communications system for use over a communications channel 110 is provided comprising generic means, message means, spreading means, summer means, transmitting means, generic-spread-spectrum-processing means, message-spread-spectrum-processing means, acquisition and tracking means, detection means and synchronous means. The generic means and message means are embodied as a transmitter-generic-chip-code generator 101 and transmitter-message-chip-code generator 102. The spreading means is shown as an EXCLUSIVE-OR device 103, which may be an EXCLUSIVE-OR gate. Summer means is a combiner 105 and the transmitting means includes a transmitter which is embodied as a signal source 108 coupled to modulator 107. The transmitter-message-chip-code generator 102 is coupled to the EXCLUSIVE-OR device 103. The transmitter-generic-chip-code generator 101 is shown coupled to the transmitter-message-chip-code generator 102 and the source for message data. The EXCLUSIVE-OR device 103 and the transmitter-generic-chip-code generator 101 are coupled to the combiner 105.

The modulator 107 is coupled between the combiner 105 and the communications channel 110.

At the receiver the generic-spread-spectrum-processing means is embodied as the receiver-generic-chip-code generator 121, the generic mixer 123 and the generic-bandpass filter 125. The generic mixer 123 is coupled between the receiver-generic-chip-code generator 121 and the generic-bandpass filter 125. The message-spread-spectrum-processing means is embodied as a receiver-message-chip-code generator 122, a message mixer 124 and a message-bandpass filter 126. The message mixer 124 is coupled between the receiver-message-chip-code generator 122 and the message-bandpass filter 126. A power splitter 115 is coupled between the communications channel 110, and the generic mixer 123 and the message mixer 124.

The acquisition and tracking means is embodied as an acquisition and tracking circuit 131. The acquisition and tracking circuit 131 is coupled to an output of the generic-bandpass filter 125, and to the receiver-generic-chip-code generator 121. The receiver-message-chip-code generator 122 preferably is coupled to the receiver-generic-chip-code generator 121.

The detection means is embodied as a detector 139. The detector 139 is coupled to the message-bandpass filter 126 and the generic-bandpass filter 125. The detector 139 may be a nonsynchronous detector such as an envelope detector or square-law detector. Alternatively, the detector 139 may be a synchronous detector, which uses a recovered-carrier signal from the generic-bandpass filter 125.

The synchronous means includes bit means, a lowpass filter 128 and electronic switch 130. The bit means is embodied as a bit synchronizer 129. The lowpass filter 128 and electronic switch 130 are coupled to the bit synchronizer 129. The bit synchronizer 129, as shown in FIG. 2, preferably is coupled to the receiver-generic-chip-code generator 121. Alternatively, the bit synchronizer 129 may be coupled to an output of the detector 139.

The transmitter-generic-chip-code generator 101 generates a generic-chip-code code signal, $g_0(t)$, and the transmitter-message-chip-code generator 102 generates a message-chip-code signal, $g_1(t)$. Synchronous timing of the message data, $d_1(t)$, and the message-chip-code signal, in FIG. 2, is provided by the generic-chip-code signal, although other sources can be used such as a common clock signal for synchronization. The EXCLUSIVE-OR device 103 generates a spread-spectrum signal by spread-spectrum processing message data with the message-chip-code signal. The spread-spectrum processing may be accomplished by modulo-2 adding the message data to the message-chip-code signal. The combiner 105 combines the generic-chip-code signal with the spread-spectrum-processed signal. The combined generic-chip-code signal and spread-spectrum-processed signal may be a multilevel signal, having the instantaneous voltage levels of the generic-chip-code signal and the spread-spectrum-processed signal.

The modulator 107, as part of the transmitter, modulates the combined generic-chip-code signal and spread-spectrum-processed signal by a carrier signal, $\cos w_0 t$, at a carrier frequency, $f_0$. The modulated generic-chip-code signal and spread-spectrum processed signal are transmitted over the communications channel 110 as a spread-spectrum-communications signal, $x_c(t)$. Thus, the spread-spectrum-communications signal includes the generic-chip-code signal and the spread-spectrum processed signal as if they were each modulated separately, and synchronously, on separate carrier signals having the same carrier frequency, $f_0$, and transmitted over the communications channel.

At a receiver, the generic-spread-spectrum-processing means recovers the carrier signal, $\cos w_0 t$, from the spread-spectrum-communications signal, $x_c(t)$, and the message-spread-spectrum-processing means despreads the spread-spectrum-communications signal, $x_c(t)$, as a modulated-data signal, $d_1(t)$. More particularly, referring to FIG. 2, the spread-spectrum-communications signal received from the communications channel 110, is divided by power splitter 115. The receiver-generic-chip-code generator 121 generates a replica of the generic-chip-code signal, $g_0(t)$. The generic mixer 123 uses the replica of the generic-chip-code signal for despreading the spread-spectrum-communications signal, $x_c(t)$, from the power splitter 115, as a recovered-carrier signal. The spread-spectrum channel, of the spread-spectrum-communications signal having the generic-chip-code signal $g_0(t) \cos w_0 t$, generally does not include data so that despreading the spread-spectrum-communications signal produces the carrier signal, only. The generic-bandpass filter 125 filters the recovered-carrier signal at the carrier frequency, or equivalently, at an IF. In comparison to the message-bandpass filter 126 which has a bandwidth sufficiently wide for filtering a modulated-data signal, the generic-bandpass filter 125 can have a very narrow bandwidth for filtering the recovered-carrier signal. The very narrow bandwidth of the generic-bandpass filter 125 assists in extracting the recovered-carrier signal from noise.

The acquisition and tracking circuit 131 acquires and tracks the recovered-carrier signal from an output of the generic-bandpass filter 125. The replica of the generic-chip-code signal from the receiver-generic-chip-code generator 121 is synchronized to the recovered-carrier signal via acquisition and tracking circuit 131.

The receiver-message-chip-code generator 122 generates a replica of the message-chip-code signal, $g_1(t)$. The replica of the message-chip-code signal, $g_1(t)$, is synchronized to the replica of the generic-chip-code signal, $g_0(t)$, from the receiver-generic-chip-code generator 121. Thus, the receiver-message-chip-code generator 122, via synchronization to the receiver-generic-chip-code generator 121, has the same synchronization as the transmitter-message-chip-code generator 102 via synchronization to the transmitter-generic-chip-code generator 101. Accordingly, the spread-spectrum communications channel having the generic-chip-code signal provides coherent spread-spectrum demodulation of the spread-spectrum channels with data.

The message mixer 124 uses the replica of the message-chip-code signal for despreading the spread-spectrum-communications signal from the power splitter 115, to generate a modulated-data signal, $d_1(t) \cos w_0 t$. The modulated-data signal effectively is the message data modulated by the carrier signal. The message-bandpass filter 126 filters the modulated-data signal at the carrier frequency, or equivalently at an intermediate frequency (IF). Down converters, which convert the modulated-data signal to an IF, optionally may be used without altering the cooperative functions or teachings of the present invention.

The detector 139 demodulates the modulated-data signal as a detected signal. The detected signal is filtered through lowpass filter 128, sampled by electronic switch 130 and outputted as received data, $d_1(t)$. The received data, without errors, are identical to the message data. The lowpass filter 128 and electronic switch 130 operate in an "integrate and dump" function, respectively, under the control of the bit synchronizer 129.

The bit synchronizer 129 controls the integrating and dumping of lowpass filter 128 and electronic switch 130. The bit synchronizer 129 preferably derives synchronization using the replica of the generic-chip-code signal from the receiver-generic-chip-code generator 121 as illustrated in FIG. 2. The bit synchronizer 129 also may derive synchronization from an output of the detector 139, as illustrated in FIG. 1.

In a preferred embodiment, the bit synchronizer 129 receives the replica of the generic-chip-code signal, $g_0(t)$, from the receiver-generic-chip-code generator 121. The replica of the generic-chip-code signal, by way of example, may include a chip-code word having 8250 chips. Assuming that there are eleven bits per chip-code word, then there are 750 chips per bit of data. Since the replica of the generic-chip-code signal provides information to the bit synchronizer 129 as to where the chip-code word begins, the bit synchronizer 129 thereby knows the timing of the corresponding bits for synchronization.

Figure 3A:
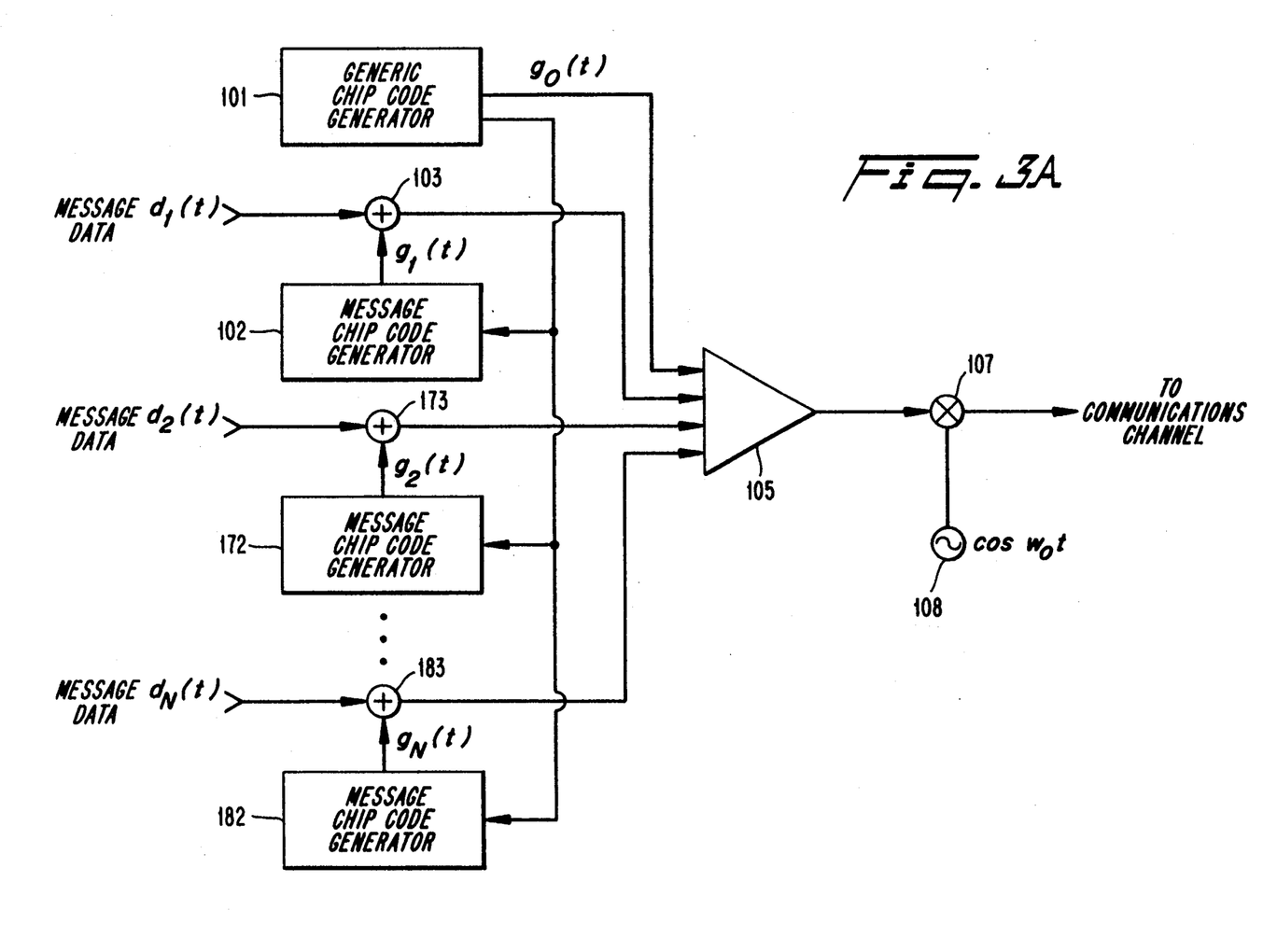
FIG. 3A shows a synchronous spread spectrum transmitter system for a plurality of message data.

The present invention further may include transmitting as the spread-spectrum-communications signal a plurality of spread-spectrum-processed signals for handling a plurality of message data. In this case the invention includes a plurality of message means and a plurality of spreading means. Referring to FIG. 3A, the plurality of message means may be embodied as a plurality of transmitter-message-chip-code generators and the plurality of spreading means may be embodied as a plurality of EXCLUSIVE-OR gates. The plurality of transmitter-message-chip-code generators generates a plurality of message-chip-code signals. In FIG. 3A, the plurality of transmitter-message-chip-code generators is shown as first transmitter-message-chip-code generator 102 generating first message-chip-code signal, $g_1(t)$, second transmitter-message-chip-code generator 172 generating second message-chip-code signal, $g_2(t)$, through $N^{th}$ transmitter-message-chip-code generator 182 generating $N^{th}$ message-chip-code signal, $g_N(t)$. The plurality of EXCLUSIVE-OR gates is shown as first EXCLUSIVE-OR gate 103, second EXCLUSIVE-OR gate 173, through $N^{th}$ EXCLUSIVE-OR gate 183. The plurality of EXCLUSIVE-OR gates generates a plurality of spread-spectrum-processed signals by modulo-2 adding the plurality of message data $d_1(t), d_2(t), \ldots, d_N(t)$ with the plurality of message-chip-code signals $g_1(t), g_2(t), \ldots, g_N(t)$, respectively. More particularly, the first message data, $d_1(t)$, are modulo-2 added with the first message-chip-code signal, $g_1(t)$, the second message data, $d_2(t)$, are modulo-2 added with the second message-chip-code signal, $g_2(t)$, through the $N^{th}$ message data, $d_N(t)$, which are modulo-2 added with the $N^{th}$ message-chip-code signal, $g_N(t)$.

The transmitter-generic-chip-code generator 101 is coupled to the plurality of transmitter-message-chip-code generators and the source for the plurality of message data, $d_1(t), d_2(t), \ldots d_N(t)$. The generic-chip-code signal $g_0(t)$, in a preferred embodiment, provides synchronous timing for the plurality of message-chip-code signals $g_1(t), g_2(t), \ldots, g_N(t)$, and the plurality of message data $d_1(t), d_2(t), \ldots, d_N(t)$.

The combiner 105 combines the generic-chip-code signal and the plurality of spread-spectrum-processed signals, by linearly adding the generic-chip-code signal with the plurality of spread-spectrum-processed signals. The combined signal typically is a multilevel signal, which has the instantaneous voltage levels of the generic-chip-code signal and the plurality of spread-spectrum-processed signals.

The modulator 107, as part of the transmitter, modulates the combined generic-chip-code signal and the plurality of spread-spectrum-processed signals by a carrier signal, $\cos w_o t$, at a carrier frequency, $f_o$. The modulated generic-chip-code signal and the plurality of spread-spectrum processed signals are transmitted over the communications channel 110 as a spread-spectrum-communications signal, $x_c(t)$. The spread-spectrum-communications signal, $x_c(t)$ has the form:

$$x_c(t) = \left( g_0(t) + \sum_{i=1}^{N} [g_i(t) \oplus d_i(t)] \right) \cos w_o t$$

Thus, the spread-spectrum-communications signal includes the generic-chip-code signal and the plurality of spread-spectrum-processed signals as if they were each modulated separately, and synchronously, on separate carrier signals with the same carrier frequency, $f_o$, and transmitted over the communications channel.

Figure 3B:
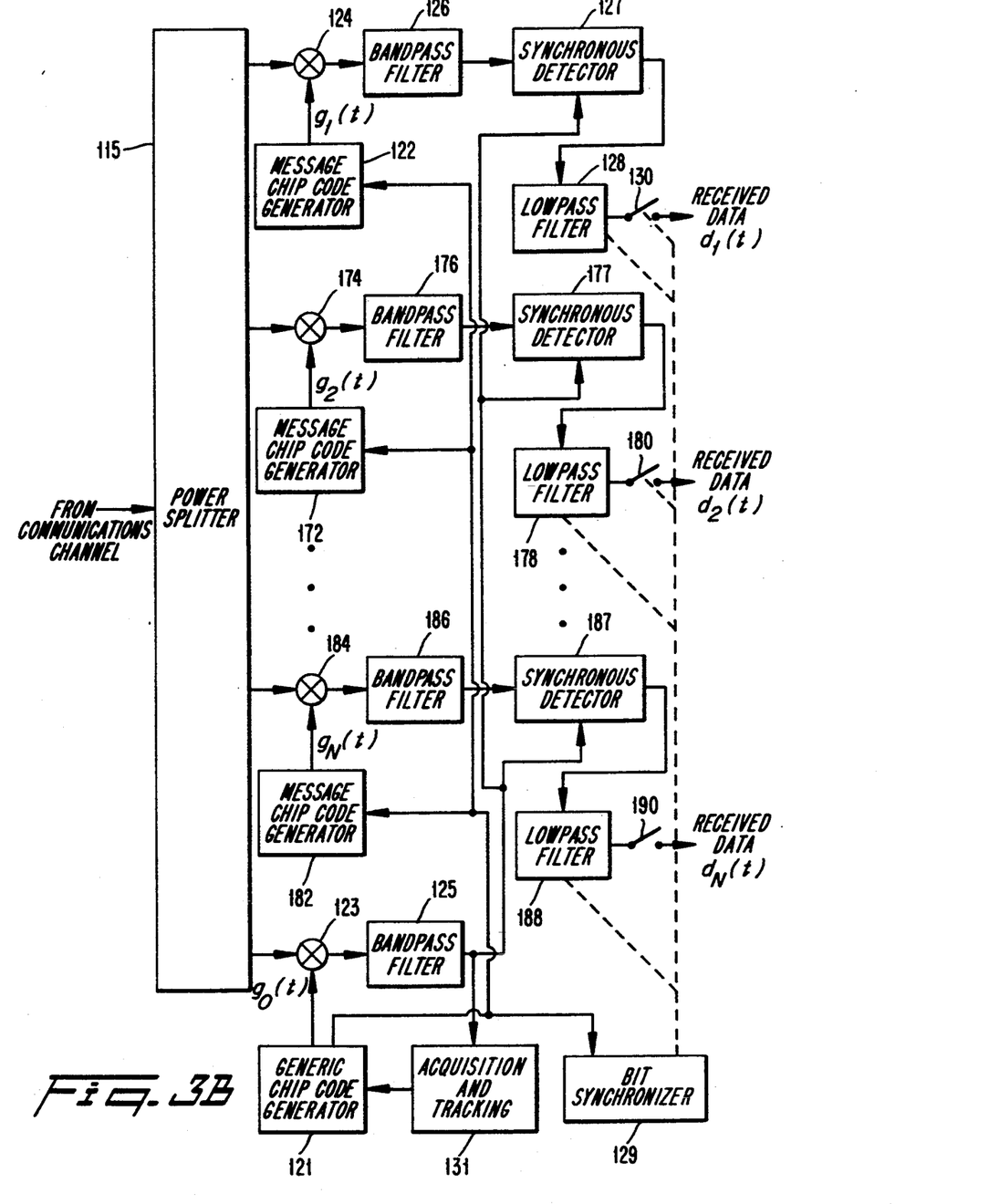
FIG. 3B shows a spread spectrum receiver using a synchronous detector for receiving a plurality of spread-spectrum processed signals.

The present invention includes receiving a spread-spectrum-communications signal which has a plurality of spread-spectrum-processed signals. The receiver further includes a plurality of message-spread-spectrum processing means, a plurality of detection means and a plurality of synchronous means. The plurality message-spread-spectrum-processing means, as shown in FIG. 3B, may be embodied as a plurality of message-chip-code generators, a plurality of message mixers and a plurality of message-bandpass filters. A mixer is connected between a respective message-chip-code generator and message-bandpass filter. The plurality of message mixers is coupled to the power splitter 115. More particularly, the plurality of message-chip-code generators is shown embodied as first message-chip-code generator 122, second message-chip-code generator 172, through $N^{th}$ message-chip-code generator 182. The plurality of message mixers is shown as first message mixer 124, second message mixer 174 through $N^{th}$ message mixer 184. The plurality of message-bandpass filters is shown as first message-bandpass filter 126, second message-bandpass filter 176, through $N^{th}$ message-bandpass filter 186.

The plurality of detection means may be embodied as a plurality of synchronous detectors which is shown as first synchronous detector 127, second synchronous detector 177 through $N^{th}$ synchronous detector 187. Each of the plurality of synchronous detectors are coupled to one of the plurality message-bandpass filters.

The plurality of synchronous means may include a bit synchronizer 129, a plurality of lowpass filters and a plurality of electronic switches. The plurality of lowpass filters is shown as first lowpass filter 128, second lowpass filter 178, through $N^{th}$ lowpass filter 188. The plurality of electronic switches is shown as first electronic switch 130, second electronic switch 180 through $N^{th}$ electronic switch 190. Each of the plurality of synchronous detectors is coupled to an output of the generic-bandpass filter 125. The recovered-carrier signal from the generic-bandpass filter 125 serves as the reference signal for synchronously demodulating each of the plurality of message-data signals by the plurality of synchronous detectors, as a plurality of received data, $d_1(t), d_2(t), \ldots, d_N(t)$.

Figure 3C:
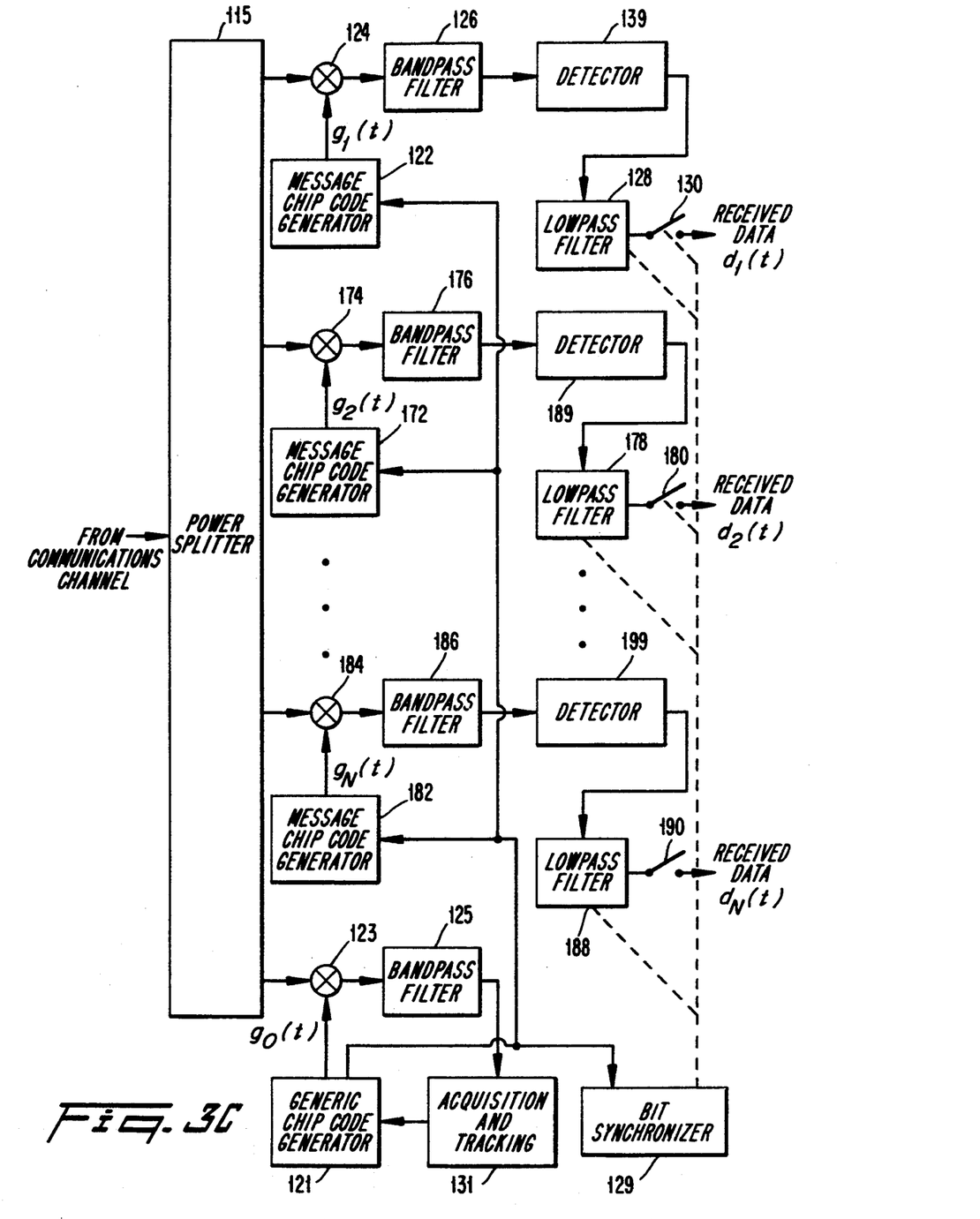
FIG. 3C shows a spread spectrum receiver using a nonsynchronous detector for receiving a plurality of spread-spectrum processed signals.

The detection means alternatively may be embodied as a plurality of nonsynchronous detectors, such as envelope detectors 139, 189, 199, as shown in FIG. 3C. Typically, the nonsynchronous detectors do not require the recovered-carrier signal.

The bit synchronizer 129 derives timing from the replica of the generic-chip-code signal, $g_0(t)$, and controls the timing of the integrating and dumping functions of the plurality lowpass filters and the plurality of electronic switches.

With the use of the invention as embodied in FIG. 3B, a generic-spread-spectrum channel, as part of the spread-spectrum-communications signal, provides the recovered-carrier signal, as discussed previously. The acquisition and tracking circuit 131 acquires and tracks the recovered-carrier signal from an output of the generic-bandpass filter 125. The replica of the generic-chip-code signal from the receiver-generic-chip-code generator 121 is synchronized to the recovered-carrier signal via acquisition and tracking circuit 131. The receiver-generic-chip-code generator 121 generates a replica of the generates a replica of the generic-chip-code signal, $g_0(t)$, which provides timing to bit synchronizer 129 and to the plurality of receiver-message-chip-code generators 122, 172, 182.

Figure 4:
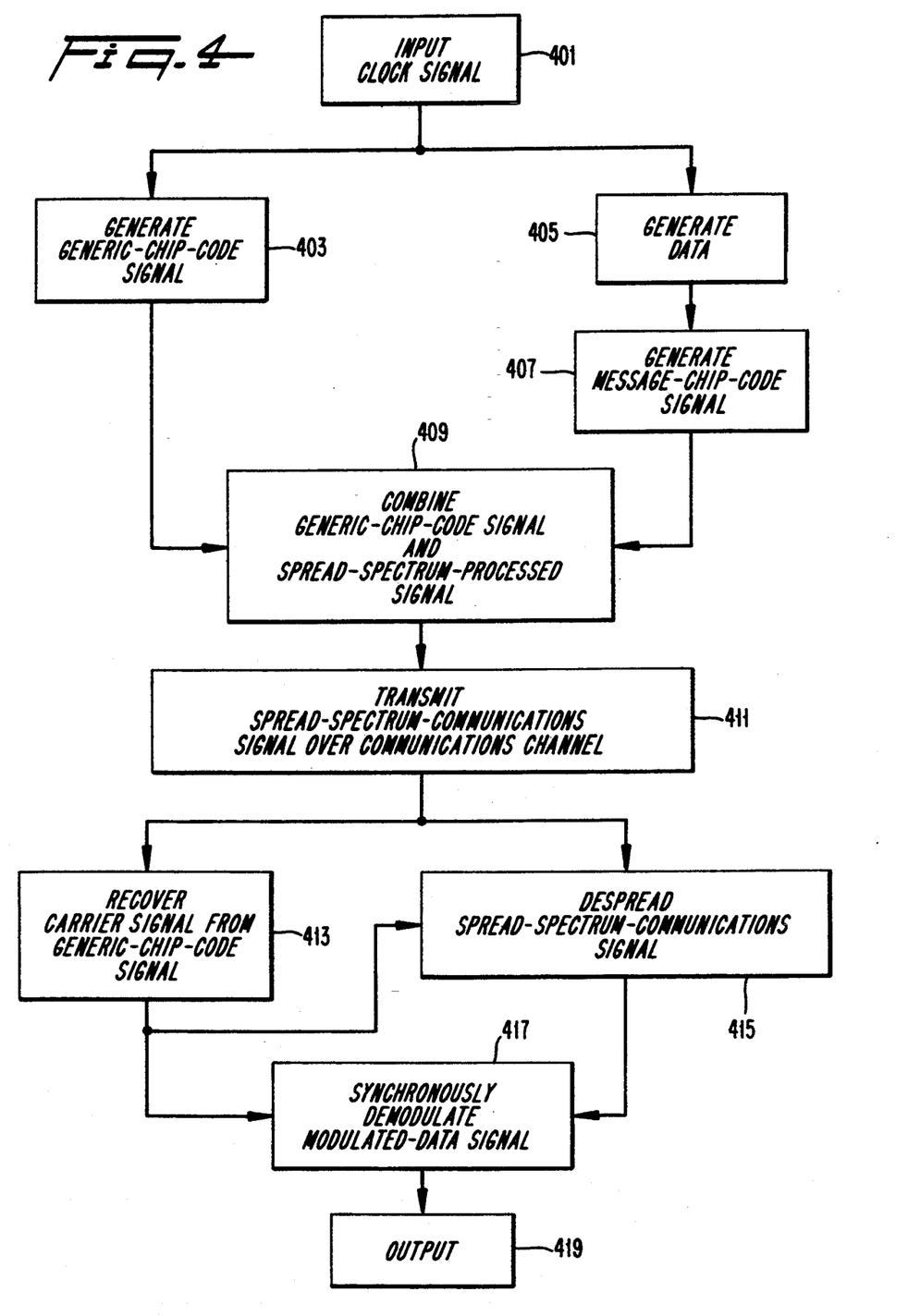
FIG. 4 shows a synchronous spread-spectrum demodulating method.

The present invention also includes a method for synchronously demodulating a spread-spectrum-communications signal. Message data are input to the spreading means. Referring to FIG. 4, the method comprises the steps of generating 403 a generic-chip-code signal. The method further includes generating 405 message data synchronized to the generic-chip-code signal, and generating 407 a message-chip-code signal synchronized to the generic-chip-code signal. Message data are processed, using a spread-spectrum modulator, with the message-chip-code signal to generate a spread-spectrum-processed signal. The generic-chip-code signal is combined 409 with the spread-spectrum-processed signal. The method transmits 411 the combined generic-chip-code signal and spread-spectrum-processed signal on a carrier signal over the communications channel as a spread-spectrum-communications signal.

At a receiver, the method includes recovering 413 the carrier signal from the spread-spectrum-communications signal and despreading 415 the spread-spectrum-communications signal as a modulated-data signal. The recovered-carrier signal is used to synchronize the step of despreading the spread-spectrum-communications signal and to optionally synchronously demodulate 417 and output 419 the modulated-data signal as received data.

In use, the transmitter-generic-chip-code generator 101 generates the generic-chip-code signal, $g_0(t)$. Message data are spread-spectrum processed by the EXCLUSIVE-OR device 103 with message-chip-code signal, $g_1(t)$, from transmitter-message-chip-code generator 102. The combiner 105 combines the generic-chip-code signal with the spread-spectrum-processed signal. The combined signal may be, for example, a multilevel signal, which is generated by linearly adding the voltage levels of the generic-chip-code signal and the spread-spectrum-processed signal, or by adding the voltage levels of the generic-chip-code signal with a plurality of spread-spectrum-processed signals. The transmitter transmits on a carrier signal having a carrier frequency, $f_o$, the combined generic-chip-code signal and the plurality of spread-spectrum-processed signals. The spread-spectrum-communications signal is transmitted through the communications channel 110.

At the receiver, the generic-spread-spectrum-processing means, embodied as the receiver-generic-chip-code generator 121, the generic mixer 123 and the generic-bandpass filter 125, cooperatively operate to recover the carrier signal from the spread-spectrum-communications signal. The message-spread-spectrum-processing means, embodied as the receiver-message-chip-code generator 122, the message mixer 124 and the message-bandpass filter 126, cooperatively despread the spread-spectrum-communications signal as the modulated-data signal. The receiver-message-chip-code generator 122 preferably is synchronized to the replica of the generic-chip-code signal from the receiver-generic-chip-code generator 121. A plurality of receiver-message-chip-code generators may be employed, synchronized to the replica of the generic-chip-code signal. The synchronous means, embodied as the synchronous detector 127 synchronized to the recovered-carrier signal, demodulates the modulated-data signal as received data.

The received data are integrated and dumped by lowpass filter 128 and electronic switch 130, under control of the bit synchronizer 129. The bit synchronizer 129 preferably uses the replica of the generic-chip-code signal for synchronizing the integrate and dump functions.

It will be apparent to those skilled in the art that various modifications can be made to the synchronous spread-spectrum communications system and method of the instant invention without departing from the scope or spirit of the invention, and it is intended that the present invention cover modifications and variations of the synchronous spread-spectrum communications system and method provided they come in the scope of the appended claims and their equivalents.

I claim:

1. A spread-spectrum communications system for communicating message data comprising:

first generic means for generating a generic-chip-code signal;

spreading means for spread-spectrum processing the message data, synchronized with the generic chip-code signal, as spread-spectrum-processed-message data;

combiner means for combining the generic-chip-code signal with the spread-spectrum-processed-message data, thereby generating a base code-division-multiplex (CDM) signal;

transmitter means for transmitting, using radio waves traversing free space, the CDM signal over a communications channel;

detection means, coupled to said communications channel, for detecting the generic-chip-code signal embedded in the CDM signal, said detection means including, receiving means for receiving the CDM signal;

second generic means, coupled to said receiving means, for detecting the generic-chip-code signal embedded in the CDM signal and for generating a replica of the first generic-chip-code signal;

despreading means, synchronized with the replica of the first generic-chip-code signal, for despreading the spread-spectrum-processed-message data as a despread signal; and data detection means, synchronized with the replica of the first generic-chip-code signal, for detecting message data in the despread signal.

2. The spread-spectrum communications system as set forth in claim 1 wherein said despreading means includes,
- a message-chip-code generator for generating a message-chip-code signal synchronized to the replica of the generic-chip-code signal;
- a product detector for mixing the message-chip-code signal with a received CDM signal to generate a detected spread-spectrum signal; and
- a bandpass filter for filtering the detected spread-spectrum signal; and
- said data detection means includes a data detector, synchronized with the replica of the generic-chip-code signal, for detecting message data in the detected spread-spectrum signal.

3. A spread-spectrum communications system for communicating message data comprising:
- a generic-chip-code generator for generating a generic-chip-code signal;
- a spread-spectrum modulator for spread-spectrum processing the message data, synchronized with the generic-chip-code signal, as spread-spectrum-processed-message data;
- a combiner for combining the generic-chip-code signal with the spread-spectrum-processed-message data, thereby generating a code-division-multiplexed (CDM) signal;
- a transmitter for transmitting, using radio waves traversing free space, the CDM signal over a communications channel;
- a detector, coupled to said communications channel, for detecting the generic-chip-code signal embedded in the CDM signal, said detector including,
  - a receiver-generic-chip-code generator, synchronized to the detected-generic-chip-code signal, for generating a replica of the generic-chip-code signal;
  - a message-chip-code generator for generating, synchronized to the replica of the generic-chip-code signal, a message-chip-code signal;
  - a product detector for mixing the message-chip-code signal with a received CDM signal to generate a detected spread-spectrum signal;
  - a bandpass filter for filtering the detected spread-spectrum signal; and
  - a data detector, synchronized with the replica of the generic-chip-code signal, for detecting message data in the detected spread-spectrum signal.

4. A spread-spectrum communications method for communicating message data, comprising the steps of:
- generating a generic-chip-code signal;
- synchronizing the message data with the generic-chip-code signal;
- spread-spectrum processing the message data as a spread-spectrum-processed-message data;
- combining the generic-chip-code signal with the spread-spectrum-processed-message data, thereby generating a code-division-multiplexed (CDM) signal;
- transmitting, using radio waves traversing free space, the CDM signal over a communications channel;
- detecting, from the communications channel, the generic-chip-code signal embedded in the CDM signal;
- generating, synchronized to the detected-generic-chip-code signal, a replica of the generic-chip-code signal;
- generating, synchronized to the replica of the generic-chip-code signal, a message-chip-code signal;
- mixing the message-chip-code signal with a received CDM signal to generate a detected spread-spectrum signal;
- filtering the detected spread-spectrum signal; and
- detecting, synchronized to the replica of the generic-chip-code signal, message data in the detected spread-spectrum signal.

* * * * *